United States Patent
Liu et al.

(10) Patent No.: US 12,307,026 B2
(45) Date of Patent: May 20, 2025

(54) MULTI-VIEW FAST PHOTOGRAPHING DEVICE FOR HORNY JAWS OF CEPHALOPODS

(71) Applicant: SHANGHAI OCEAN UNIVERSITY, Shanghai (CN)

(72) Inventors: Bilin Liu, Shanghai (CN); Xianghong Kong, Shanghai (CN); Xinjun Chen, Shanghai (CN); Jipeng Wei, Shanghai (CN); Zhong Zhang, Shanghai (CN); Yingchun Li, Shanghai (CN)

(73) Assignee: SHANGHAI OCEAN UNIVERSITY, Shanghai (CN)

( * ) Notice: Subject to any disclaimer, the term of this patent is extended or adjusted under 35 U.S.C. 154(b) by 509 days.

(21) Appl. No.: 17/941,342

(22) Filed: Sep. 9, 2022

(65) Prior Publication Data
US 2023/0004240 A1    Jan. 5, 2023

Related U.S. Application Data

(63) Continuation of application No. PCT/CN2020/099605, filed on Jul. 1, 2020.

(30) Foreign Application Priority Data

Jun. 15, 2020  (CN) .......................... 202010545072.X

(51) Int. Cl.
*G06F 3/0354*    (2013.01)
*G06T 11/00*    (2006.01)

(52) U.S. Cl.
CPC .......... *G06F 3/03545* (2013.01); *G06T 11/00* (2013.01)

(58) Field of Classification Search
CPC .............................. G06F 3/03545; G06T 11/00
See application file for complete search history.

(56) References Cited

U.S. PATENT DOCUMENTS 5,805,806 A * 9/1998 McArthur .......... H04N 21/4143
                                                   348/E7.086
6,611,344 B1 * 8/2003 Chuang ................. G01B 11/24
                                                   348/E13.016
(Continued)

FOREIGN PATENT DOCUMENTS

CN    1287643 A    3/2001
CN    1575645 A    2/2005
(Continued)

OTHER PUBLICATIONS

First Office Action issued in counterpart Chinese Patent Application No. 202010545072.X, dated Apr. 17, 2024.
(Continued)

*Primary Examiner* — Michael B. Pierorazio
(74) *Attorney, Agent, or Firm* — Westbridge IP LLC

(57) ABSTRACT

Disclosed is a multi-view fast photographing device for horny jaws of cephalopods. The device includes a cover, a cover pin, a stylus, an image generating device, a data display device, and an image acquisition and processing device; a top of the image generating device is open and provided with mounting holes, and the cover is connected with the mounting holes through the cover pin and movably covers the top of the image generating device. The image acquisition and processing device is fixed at a bottom of the image generating device. The data display device is fastened to a front side wall of the image generating device. A magnetic patch is fixed on a front surface of a baffle of the data display device. The stylus is magnetically attracted to the magnetic patch.

10 Claims, 15 Drawing Sheets

(56) References Cited

U.S. PATENT DOCUMENTS

| | | | |
|---|---|---|---|
| 2007/0183646 A1 | 8/2007 | Beaty et al. | |
| 2010/0111515 A1* | 5/2010 | Saitoh | G02B 6/0018 362/558 |
| 2010/0142428 A1* | 6/2010 | Song | H04W 72/30 370/312 |
| 2010/0151904 A1* | 6/2010 | Karaoguz | H04N 21/4316 725/50 |
| 2010/0195590 A1* | 8/2010 | Park | H04W 74/0808 370/329 |
| 2010/0296498 A1* | 11/2010 | Karaoguz | H04W 88/10 370/338 |
| 2010/0311342 A1* | 12/2010 | Arbel | H04H 60/43 455/62 |
| 2010/0318701 A1* | 12/2010 | Srinivasan | G06Q 10/10 713/100 |
| 2010/0331026 A1* | 12/2010 | Hottinen | H04B 17/336 455/67.11 |
| 2011/0043710 A1* | 2/2011 | Samarasooriya | H04N 21/42203 348/735 |
| 2011/0183632 A1* | 7/2011 | Suumaki | H04W 72/542 455/180.1 |
| 2011/0263209 A1* | 10/2011 | Kasslin | H04B 17/345 455/67.11 |
| 2011/0280249 A1* | 11/2011 | Shrum, Jr. | H04L 12/2801 370/401 |
| 2011/0317019 A1* | 12/2011 | Bahl | H04L 27/0006 348/193 |
| 2012/0066608 A1* | 3/2012 | Sundermeyer | G08B 25/008 715/738 |
| 2012/0066632 A1* | 3/2012 | Sundermeyer | H04L 12/2809 715/771 |
| 2012/0098969 A1* | 4/2012 | Wengrovitz | H04N 7/185 348/E7.085 |
| 2012/0136865 A1* | 5/2012 | Blom | G06F 16/29 707/E17.046 |
| 2013/0179926 A1* | 7/2013 | White | H04L 12/2809 725/59 |

FOREIGN PATENT DOCUMENTS

| | | |
|---|---|---|
| CN | 101310515 A | 11/2008 |
| CN | 101576380 A | 11/2009 |
| CN | 102525034 A | 7/2012 |
| CN | 202393697 U | 8/2012 |
| CN | 204064459 U | 12/2014 |
| CN | 205808952 U | 12/2016 |
| CN | 108917595 A | 11/2018 |
| CN | 110044898 A | 7/2019 |
| CN | 213422087 U | 6/2021 |
| JP | 2008271106 A | 11/2008 |

OTHER PUBLICATIONS

International Search Report issued in corresponding PCT Application No. PCT/CN2020/099605, dated Mar. 10, 2021.

\* cited by examiner

MULTI-VIEW FAST PHOTOGRAPHING DEVICE FOR HORNY JAWS OF CEPHALOPODS

CROSS-REFERENCE TO RELATED APPLICATIONS

This application is a continuation of International Application No. PCT/CN2020/099605, filed on Jul. 1, 2020, which claims priority to Chinese Patent Application No. 202010545072.X, filed on Jun. 15, 2020. The disclosures of the aforementioned applications are hereby incorporated by reference in their entireties.

TECHNICAL FIELD

The application belongs to the field of image acquisition and biological information, and in particular to a shooting device for quickly shooting multi-view images of horny jaws of cephalopods and acquiring morphological parameters by using computer image acquisition technology.

BACKGROUND

Horny jaws are hard chitin tissues in mouth balls of cephalopods, and are mainly used for chopping foods. The horny jaws have characteristics of a stable morphological structure and a corrosion resistance, and store biological information of the cephalopods well. An analysis of the biological information stored in the horny jaws is an important point in a biological research of marine fishery resources. Statistics of morphological parameters, the analysis of stable isotopes, an interpretation of whorls, etc., may be carried out by using the horny jaws, so as to provide a theoretical basis for the research of a marine biological population classification and identification, a fish stock assessment and prediction, a global climate change and a fishery production. Among them, a determination of the morphological parameters of horny jaws is the basis of various related studies on the cephalopods.

At present, a common method to measure the morphological parameters of the horny jaws is to use a vernier caliper and other measuring tools. The horny jaws have the characteristics of an irregular shape, a small volume and slippery surfaces. The conventional method is low in cost and simple, but researchers are prone to accidental errors due to factors such as a difficult measurement, a wrong operation and a wrong reading, and a data collection speed is slow because of a large number of samples and a heavy workload. Therefore, the device according to the application develops an efficient measuring device which uses a computer image recognition technology instead of a conventional manual measurement, and improves a measurement accuracy and speeds up a measurement speed.

SUMMARY

In order to overcome shortcomings of the prior art, the application aims to provide an efficient measuring device for horny jaws of cephalopods. The device efficiently extracts morphological parameters of the horny jaws of the cephalopods by utilizing a computer image recognition technology, and solves problems of large errors and a slow measuring speed of a conventional manual measurement.

A technical scheme of the application is as follows.

A multi-view fast photographing device for horny jaws of cephalopods includes a cover, a cover pin, a stylus, an image generating device, a data display device, and an image acquisition and processing device; a top of the image generating device is open and provided with mounting holes, and the cover is connected with the mounting holes through the cover pin and movably covers the top of the image generating device. The image acquisition and processing device is fixed at a bottom of the image generating device. The data display device is fastened to a front side wall of the image generating device. A magnetic patch is fixed on a front surface of a baffle of the data display device. The stylus is magnetically attracted to the magnetic patch.

The image generating device includes a box, two A-type floodlights, two B-type floodlights, a stage, a slide glass, a camera, two total reflection right angle prisms, a level, and first adjusting nuts; and two groups of threaded holes are respectively left at a same position of vertical center lines of two adjacent inner walls of the box. Inner side walls of the box are provided with the mounting holes. One A-type floodlight and one B-type floodlight are mounted on the adjacent inner walls of the box through a screw connection. A center of the stage and partial areas on the both sides of the center are provided with concave slots, so as to horizontally mount the slide glass and the two total reflection right angle prisms respectively; and mounting positions of the two total reflection right angle prisms are mirror symmetric about diagonal faces of the box. The level is fixed on the stage. The stage is connected to the mounting holes of the box through the first adjusting nuts. The two A-type floodlights and the two B-type floodlights provide stable indirect floodlights for photographing three views of horny jaw samples, so that the camera is prevented from taking strong backlight photos, and the photos have a good light and a color consistency.

The data display device includes a baffle and a display screen. The front side wall of the box is provided with mounting grooves. The display screen is fastened in the mounting grooves of the box. The baffle has a rectangular notch, which is assembled with the box through the screw connection and fixed on an outside of the display screen, ensuring that a display of the display screen is embedded in the rectangular notch of the baffle and completely exposed from the side of the box.

The image acquisition and processing device includes a base, a top plate, a main control board, an interface extender, three cameras and three camera protection shells. The bottom of the base is provided with the mounting holes and mounting slots, and the top is open. The center of the top plate and the partial areas of both sides of the center are provided with the mounting grooves, and the mounting grooves on the both sides are mirror symmetrical with respect to the diagonal faces of the top plate. The top plate is connected with the base and fastened to the top of the base. The main control board is connected with the mounting holes and fastened to the bottom of the base. The interface extender is fixed in the mounting slots. Circular notches are left at the tops of the three camera protection shells. The three cameras are respectively fastened above the three mounting grooves. The three camera protection shells are respectively fastened above the three cameras, and ensure that lenses of the cameras are embedded in the circular notches and completely exposed upwards.

Optionally, the two A-type floodlights are located above the two B-type floodlights. The two A-type floodlights need to form a certain included angle with a horizontal plane of the stage. The included angle needs to meet following requirements: spots generated by each A-type floodlight are not directly hit a square side of each total reflection right angle prism; a center point of each A-type floodlight is aligned with the center point of the slide glass; and the cameras obtain clear photos. The two B-type floodlights respectively face square sides of the two total reflection right angle prisms, lower surfaces of the two B-type floodlights coincide with an upper surface of the stage, and horizontal center lines of the two B-type floodlights are orthogonal to a vertical center line of the stage.

Optionally, inner surfaces of the box and the cover are covered with black materials to better absorb lights and not reflect the lights obviously.

Optionally, rectangular sides of the total reflection right angle prisms are coated with optical films, the square sides and square bottoms are polished, and two triangular sides are frosted to ensure compliance with a prism internal reflection principle.

Optionally, a lens center of the camera in the center of the top plate is just opposite to a bottom center of the slide glass, and the lens centers of the two cameras on the both sides of the center of the top plate are respectively opposite to the square bottom centers of the two total reflection right angle prisms.

Optionally, the side wall of the base of the image acquisition and processing device is fixed with a power interface connected with a power supply or a computer, and a button for controlling a switch of the device.

Optionally, the device further includes level assemblies; the level assemblies are composed of a level fixed on the stage, the first adjusting nuts connecting the stage and the box, and second adjusting nuts fixed on the bottom of the base.

Compared with the prior art, the application has following beneficial effects.

Firstly, the device includes the level assemblies; the level assemblies are composed of the level fixed on the stage, the first adjusting nuts connecting the stage and the box, and the second adjusting nuts fixed on the bottom of the base, so as to meet a requirement of regulating a device level.

Secondly, the top of the device adopts a flip structure, so that an experimenter may conveniently change the horny jaw samples.

Thirdly, the stage utilizes the internal reflection principle of the total reflection right angle prisms and a transparency of the slide glass to ensure that the three cameras of the image acquisition and processing device may take photos on three surfaces of each horny jaw on a reference plane, so that an image acquisition efficiency is improved and a structure layout of the device is optimized.

Fourthly, the inner walls of the box and the cover of the device are covered with the black materials to better absorb and not obviously reflect the lights; the A-type floodlights and the B-type floodlights are used inside the box for non-direct and stable floodlighting, so as to have the good light and color consistency, prevent the cameras from taking backlight photos, avoid an influence of external light changes on taking photos, improve a light environment for taking photos, and further improve a measurement accuracy of the device.

Fifthly, the main control board of the device may run custom software to realize the functions of controlling the A-type floodlights and the B-type floodlights, controlling the cameras to take photos, image transmission and processing, data transmission and processing, etc. The experimenter may use the stylus to operate the software interface on the display, and finally display the morphological parameters of horny jaw on the display after processing by the main control board. The measurement accuracy of the custom software may better meet scientific research needs.

Lastly, the side wall of the base of the device is fixed with the power interface and a control switch, so the device is connected with an external power supply. The experimenter switches the device conveniently through the control switch. In addition, the device may be connected to the computer, and the custom software may be run on the computer to obtain the morphological parameters of the horny jaw, thus realizing the dual functions of offline and non-offline.

To sum up, the application is an integrated device that integrates the functions of self-photographing, the image transmission and processing, the data transmission and processing, etc., and has the characteristics of a simple operation and convenient carrying. The application may quickly photograph multi-view images of the horny jaws and measure the morphological parameters of the horny jaws.

DETAILED DESCRIPTION OF THE EMBODIMENTS

Figure 1:
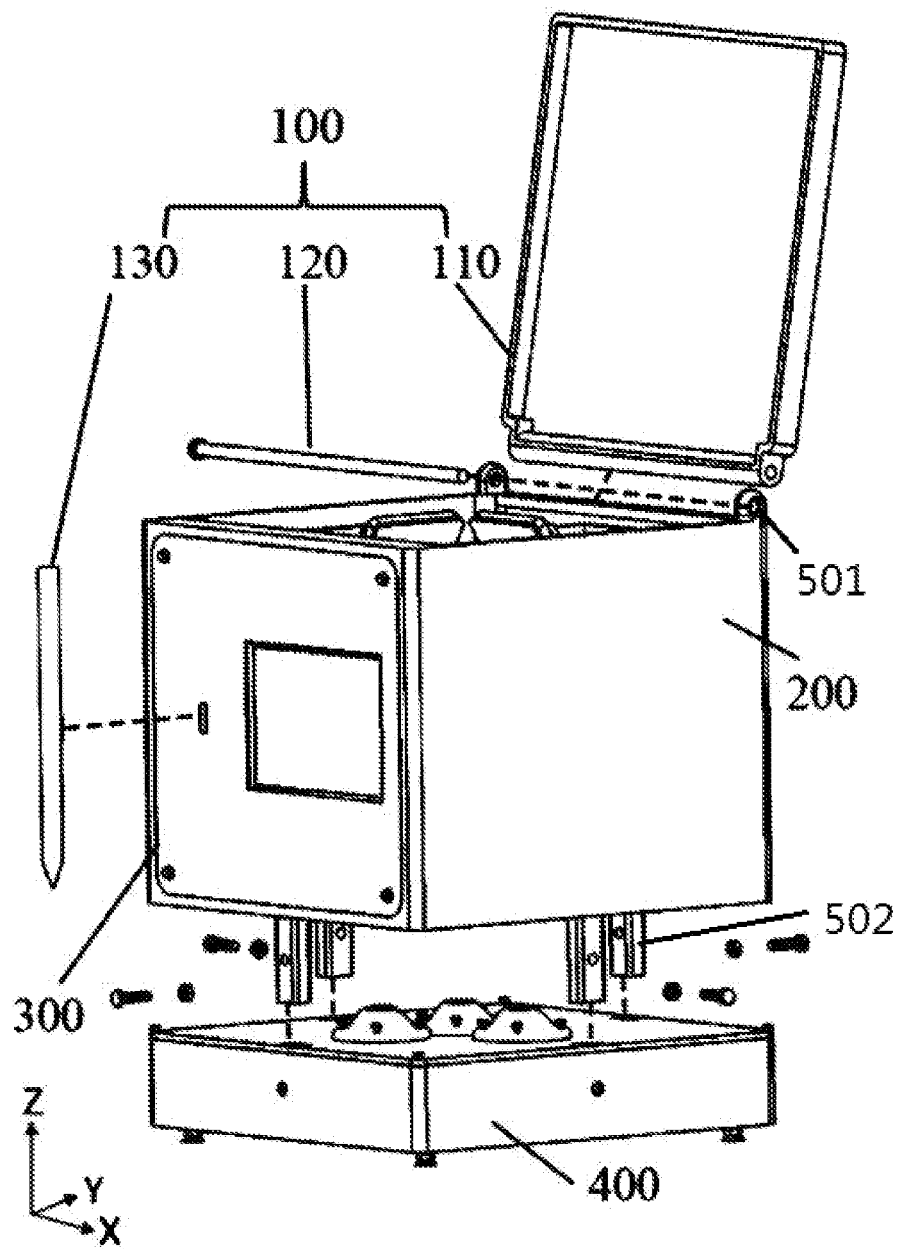
FIG. 1 is a schematic diagram according to the application.

In order to make creative features, technical means, objectives and effects of the application easy to understand, the application is further explained below with reference to attached drawings, but a scope of protection of the application is not limited to the following.

With reference to FIG. 1, FIG. 4, FIG. 5, FIG. 6, FIG. 7, and FIG. 8, this embodiment provides a multi-view fast photographing device for horny jaws of cephalopods, which includes a cover 110, a cover pin 120, a stylus 130, an image generating device 200, a data display device 300, and an image acquisition and processing device 400; a top of the image generating device 200 is open and provided with mounting holes 501, and the cover 110 is connected with the mounting holes 501 through the cover pin 120 and movably covers the top of the image generating device 200. The image acquisition and processing device 400 is fixed at a bottom of the image generating device 200. The bottom of the image generating device 200 is provided with connectors 502, and side walls of the image acquisition and processing device 400 are provided with threaded holes and concave slots. The connectors 502 are fastened with the threaded holes by bolts and are embedded in the concave slots. The data display device 300 is fastened to a front side wall of the image generating device 400. A magnetic patch 310 is fixed on a front surface of a baffle 320 of the data display device 300. The stylus 130 is magnetically attracted to the magnetic patch 310.

Figure 2:
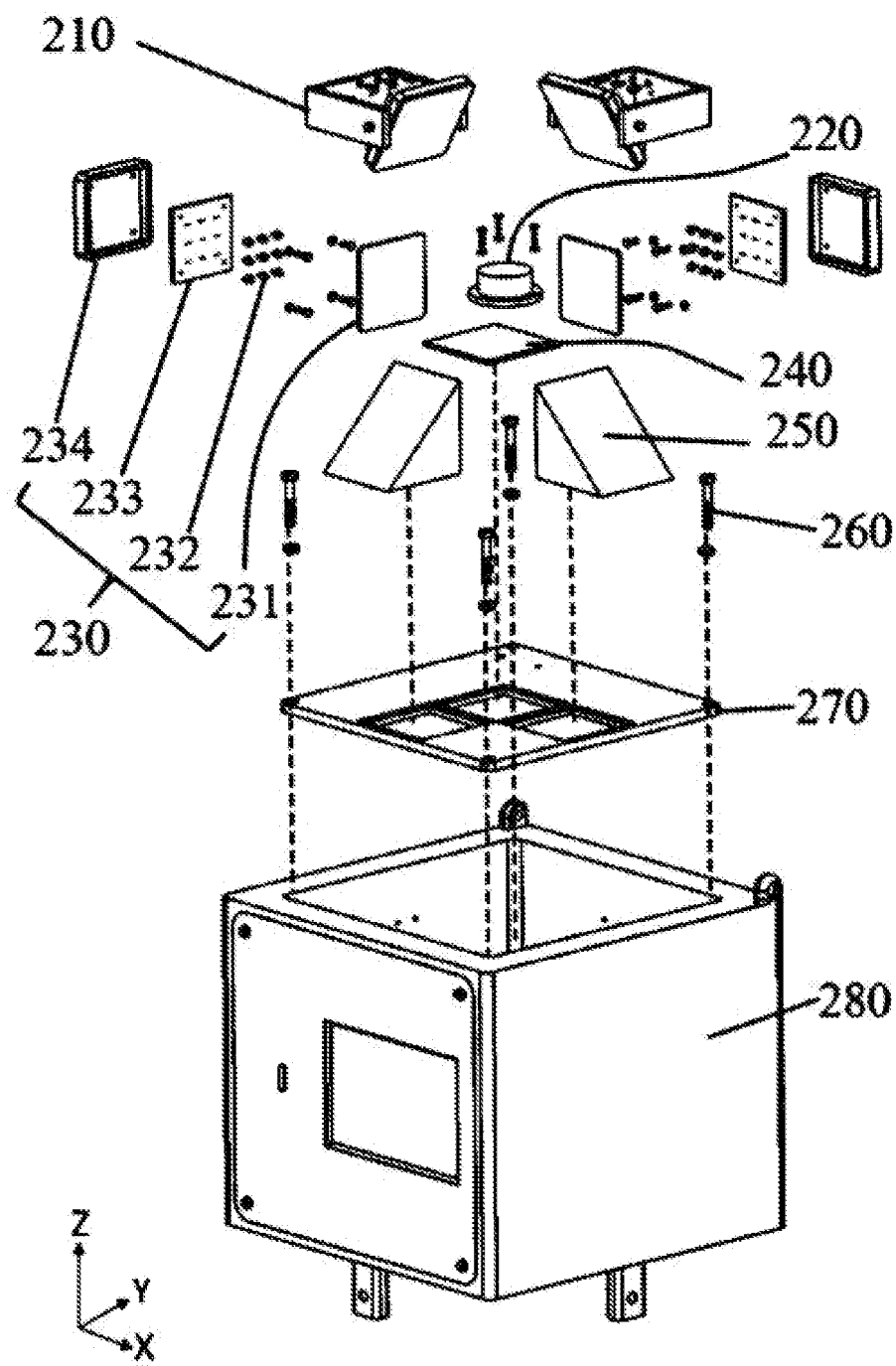
FIG. 2 is a schematic diagram of an image generating device in the application.
Figure 9:
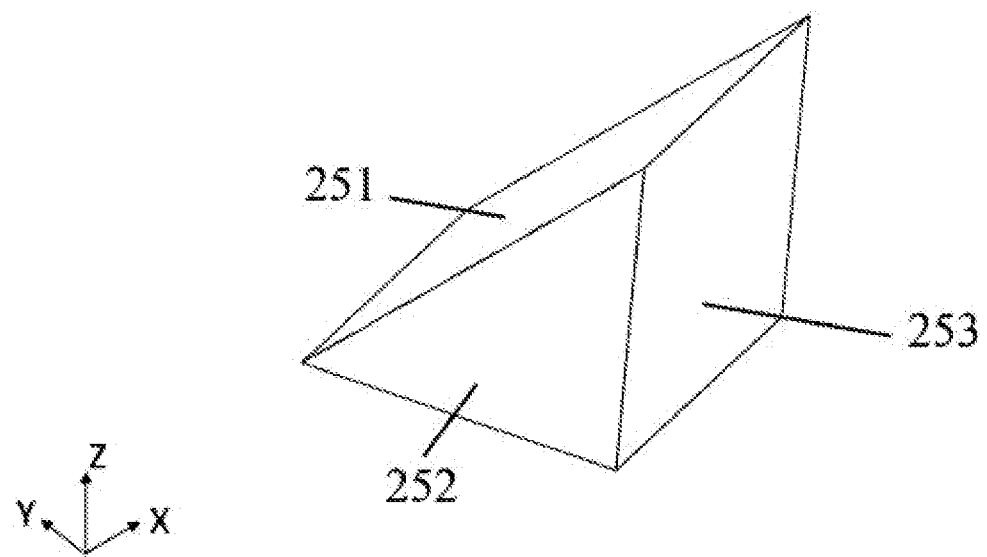
FIG. 9 is a schematic diagram of a total reflection right angle prism in the application.

With reference to FIG. 2 and FIG. 9, the image generating device 200 includes a box 280, two A-type floodlights 210, two B-type floodlights 230, a stage 270, a slide glass 240, two total reflection right angle prisms 250, a level 220, and first adjusting nuts 260; and two groups of threaded holes are respectively left at a same position of vertical center lines of two adjacent inner walls of the box 280. Inner side walls of the box 280 are provided with the mounting holes. One A-type floodlight 210 and one B-type floodlight 230 are mounted on the adjacent inner walls of the box 280 through screw connection. The two B-type floodlights 230 respectively face square sides 253 of the two total reflection right angle prisms 250, lower surfaces of the two B-type floodlights 230 coincide with an upper surface of the stage 270, and horizontal center lines of the two B-type floodlights 230 are orthogonal to the vertical center line of the stage 270. A center of the stage 270 and partial areas on both sides of the center are provided with concave slots, so as to horizontally mount the slide glass 240 and the two total reflection right angle prisms 250 respectively.

The slide glass 240 and two total reflection right angle prisms 250 are used to generate images of a horny jaw in three directions, and the slide glass 240 is also used to carry a horny jaw sample; and mounting positions of the two total reflection right angle prisms 250 are mirror symmetric about diagonal faces of the box 280. The level 220 is fixed on the stage 270. The stage 270 is connected to the mounting holes of the box 280 through the first adjusting nuts 260. The A-type floodlights 210 and the B-type floodlights 230 are used to provide stable illuminations for an inside of the device, and ensure that the device is not affected by a change of an external light. Light sources of the A-type floodlights 210 and the B-type floodlights 230 may be fluorescent lamps, LED lamps, energy-saving lamps, halogen tungsten lamps and other white light sources that provide the stable illuminations.

In this embodiment, LED white light lamps are selected as floodlight sources for explanation. LED lamps have advantages of a high efficiency, an energy saving, a long service life, an easy replacement, an environmental protection and the like. First diffuser plates 211 of the A-type floodlights 210 and second diffuser plates 231 of the B-type floodlights 230 may be frosted glass plates, acrylic plates sprayed with diffuse reflection coatings, and other materials that may ensure a good light and a color consistency. In this embodiment, the first diffuser plates 211 and the second diffuser plate 231 adopt acrylic plates with diffuse reflection coatings, so as to improve a luminous efficiency, eliminate an obvious glare and meet lighting requirements well.

Figure 3:
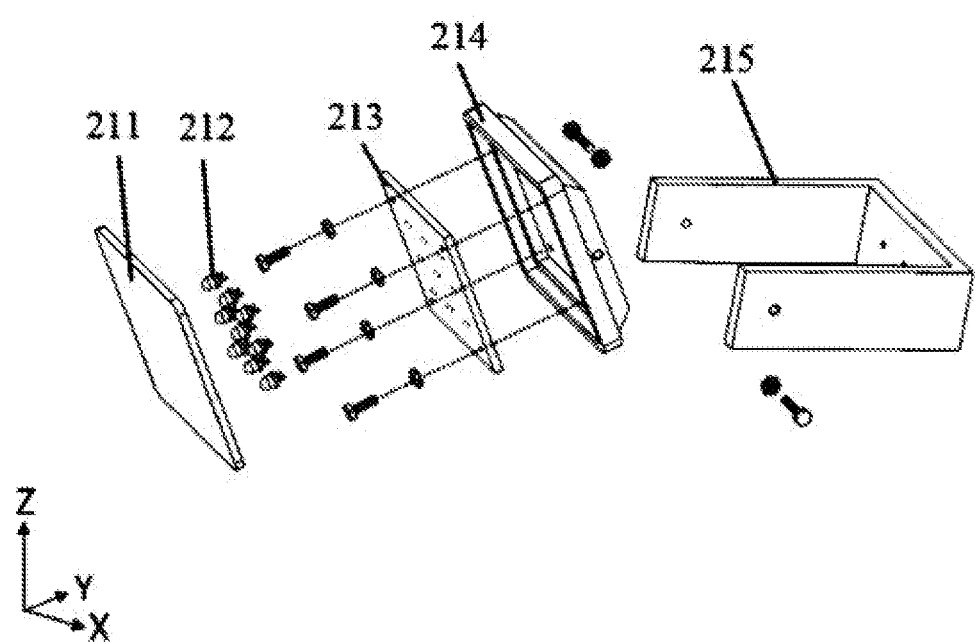
FIG. 3 is a schematic diagram of an A-type floodlight in the application.

With reference to FIG. 2 and FIG. 3, each A-type floodlight 210 includes one first diffuser plate 211, nine 3 mm LED white light beads 212, a first control panel 213, a first lampshade 214, and a lamp holder 215. In this embodiment, an included angle between the center line of the first lampshade 214 of each A-type floodlight 210 and the center line of the stage 270 is $\alpha=30°$, and the first lampshade 214 and the lamp holder 215 are fastened by screwing. A center point of each A-type floodlight 210 is aligned with the center point of the slide glass 240, with a horizontal distance L=75 mm and a distance d=50 mm from the top of the box 280. In addition to this embodiment, the included angle $\alpha$, the distance L and the distance d may be appropriately adjusted, as long as following conditions are met: spots generated by each A-type floodlight 210 are not directly hit a square side of each total reflection right angle prism 250; the center point of each A-type floodlight 210 is aligned with the center point of the slide glass 240; a camera 420 obtains clear photos without obvious spots. Nine 3 mm LED white light beads 212 are uniformly welded on each first control panel 213, and then they are embedded in the concave slots of the first lampshade 214 through a screw connection, and each first diffuser plate 211 is fixed on each first lampshade 214. Each B-type floodlights 230 includes one second diffuser plate 231, nine 3 mm LED white second light beads 232, a second control board 233 and a second lampshade 234. A connection mode of the second diffuser plate 231, the nine 3 mm LED white second light beads 232, the second control board 233 and the second lampshade 234 of each B-type floodlight 230 is the same as that of each A-type floodlight 210.

Figure 6:
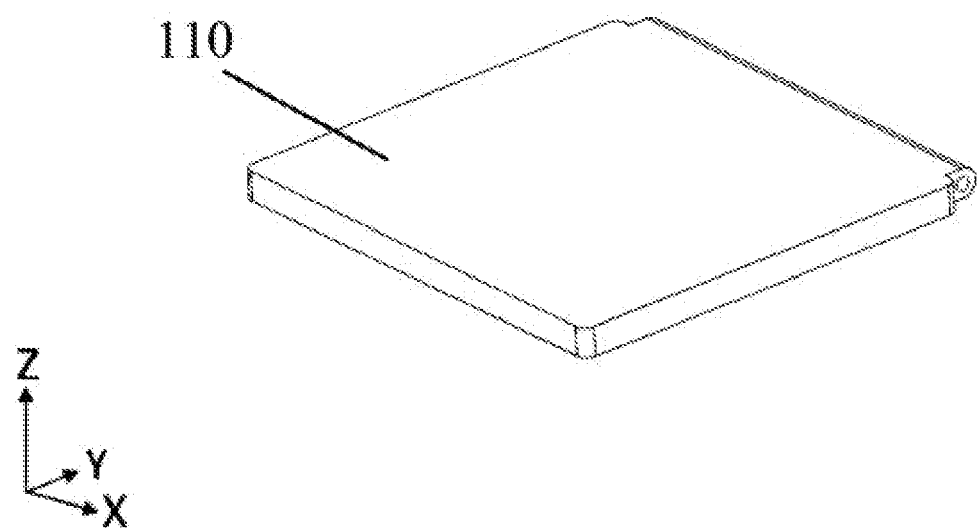
FIG. 6 is a schematic diagram of a cover of the application.
Figure 7:
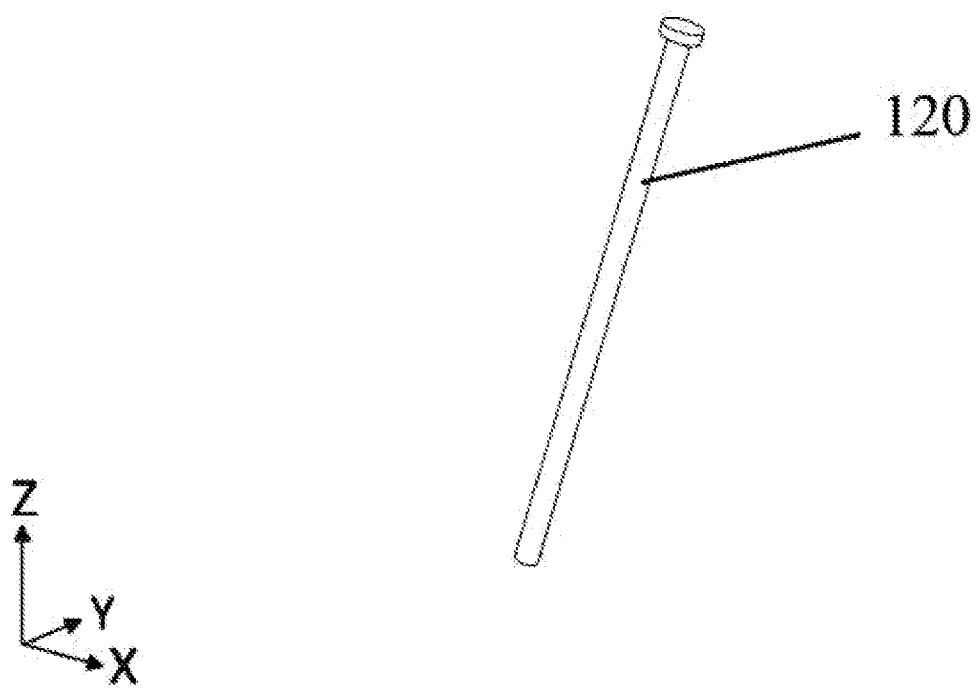
FIG. 7 is a schematic diagram of a cover pin in the application.
Figure 8:
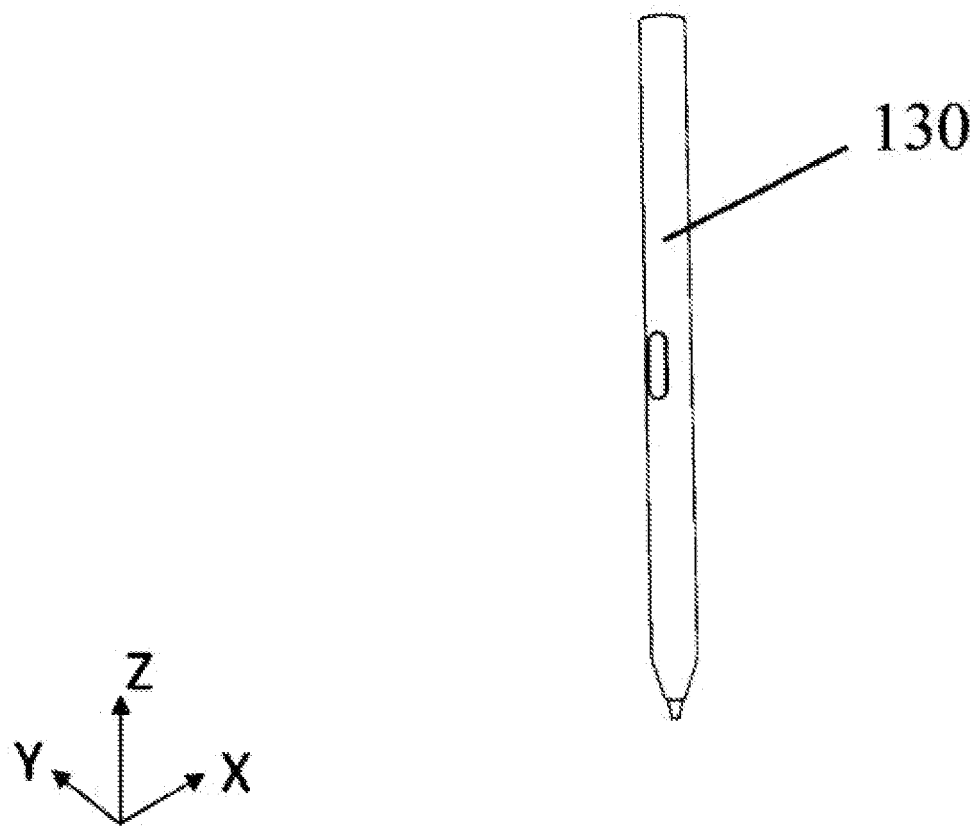
FIG. 8 is a schematic diagram of a stylus in the prior art.

With reference to FIG. 2 and FIG. 6, the inner surfaces of the cover 110 and the box 280 are covered with black materials to absorb lights and do not reflect the lights. In this embodiment, black matte films after sandblasting are selected. The black materials have a strong adhesion and a good non-reflection effect, and also improve a fatigue resistance of the device. In addition to this embodiment, the black materials may also be frosted matte black stickers, black matte materials after a sandblasting, or other black materials with the effect of isolating the external light and not obviously reflecting the internal light.

With reference to FIG. 9, a rectangular side 251 of the total reflection right angle prism 250 is coated with a reflective film, which may be a metal reflective film, an all-dielectric reflective film and other optical films that may increase a reflectivity of an optical surface. In this embodiment, pure aluminium reflective films are used, and a triangular side 252 is frosted, and the square side 253 and a square bottom are polished to ensure that the prism follows a principle of an internal reflection. Each total reflection right angle prism 250 is easy to install, and has a good structural stability and an excellent reflection effect.

Figure 4:
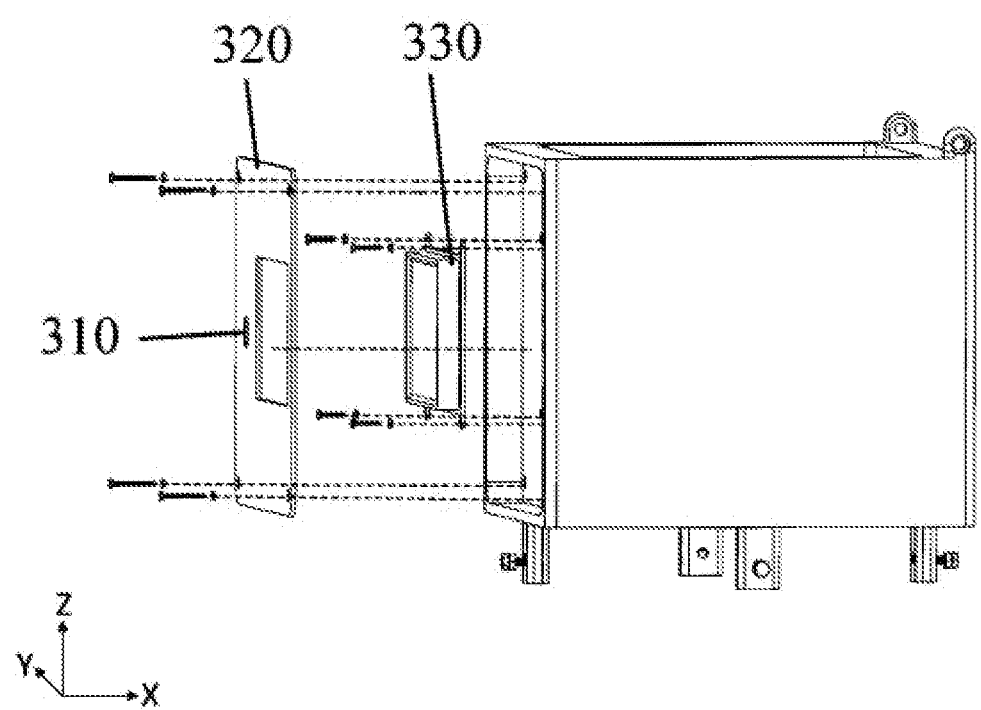
FIG. 4 is a schematic diagram of a data display device in the application.
Figure 10:
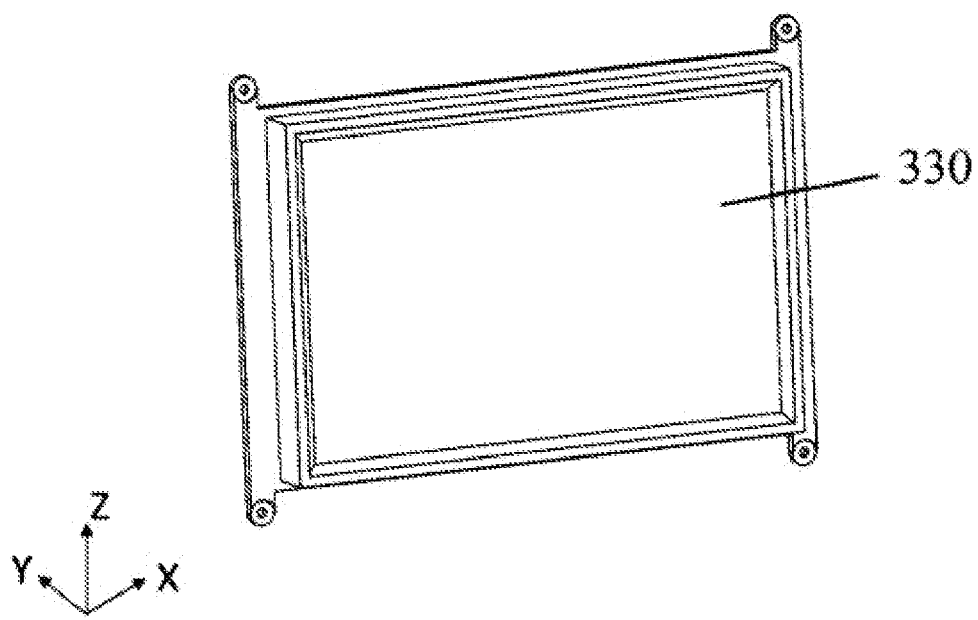
FIG. 10 is a schematic diagram of a display in the prior art.
Figure 11:
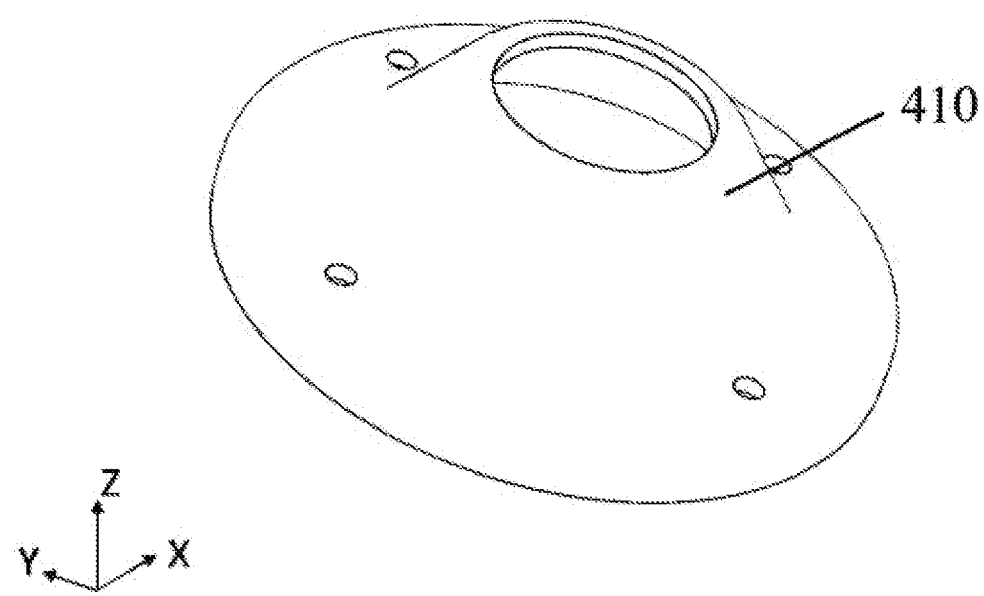
FIG. 11 is a schematic diagram of a camera protection shell in the prior art.
Figure 12:
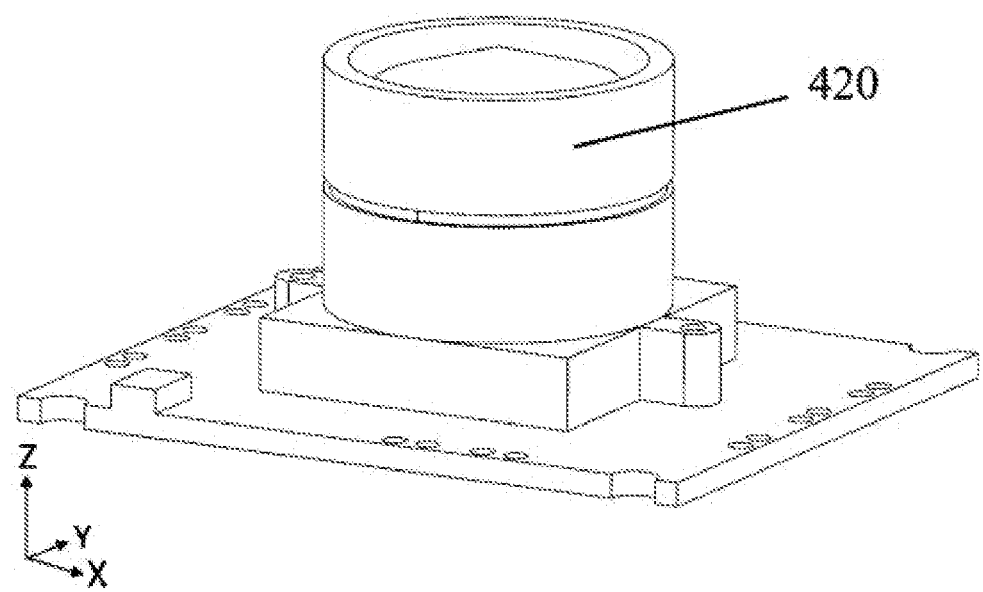
FIG. 12 is a schematic diagram of a camera in the prior art.
Figure 13:
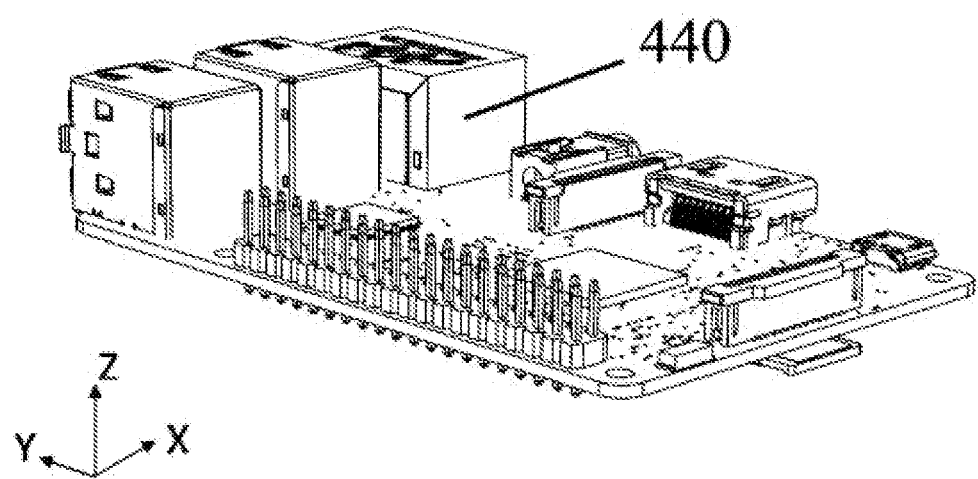
FIG. 13 is a schematic diagram of a main control board in the prior art.
Figure 14:
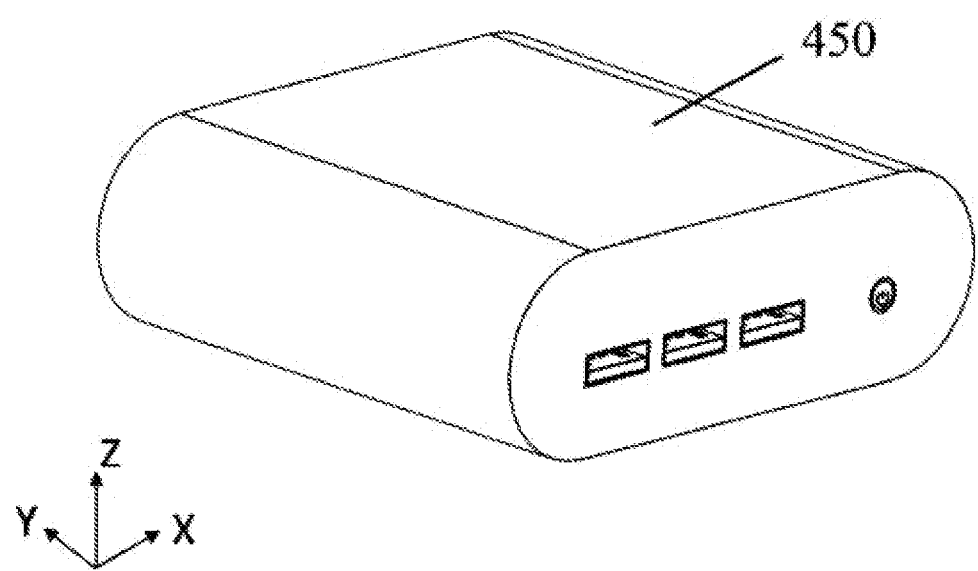
FIG. 14 is a schematic diagram of an interface extender in the prior art.

With reference to FIG. 4 and FIG. 10, the data display device 300 includes a baffle 320 and a display screen 330. The front side wall of the box 280 is provided with mounting grooves. The display screen 330 is fastened in the mounting grooves of the box 280 through the screw connection. The baffle 320 has a rectangular notch, which is assembled with the box 280 through screw connection and fixed on an outside of the display screen 330, ensuring that the display of the display screen 330 is embedded in the rectangular notch of the baffle 320 and completely exposed from the side of the box 280. The display screen 330 needs to have following functions: a touch screen; an interface capable of displaying software run by a main control board 440. In this embodiment, a 5-inch Raspberry Pi display screen is preferred. It cooperates with the stylus 130, operates on the display screen 330, and displays an interface of the software running on the main control board 440, so that the device has a good man-machine interaction.

With reference to FIG. 5, FIG. 11, FIG. 12, FIG. 13 and FIG. 14, the image acquisition and processing device 400 includes a base 480, a top plate 430, a main control board 440, an interface extender 450, three cameras 420, three camera protection shells 410 and second adjusting nuts 490. The bottom of the base 480 is provided with the mounting holes and mounting slots, and the top is open. The center of the top plate 430 and the partial areas of both sides of the center are provided with the mounting grooves, and the mounting grooves on the both sides are mirror symmetrical with respect to the diagonal face of the top plate 430. The top plate 430 is connected with the base 480 and fastened to the top of the base 480. The main control board 440 is connected with the mounting holes and fastened to the bottom of the base 480. The interface extender 450 is fixed in the mounting slots. Circular notches are left at the tops of the three camera protection shells 410. The three cameras 420 are respectively fastened above the three mounting grooves. The three camera protection shells 410 are respectively fastened above the three cameras 420, and ensure that lenses of the cameras 420 are embedded in the circular notches and completely exposed upwards. The second adjusting nuts 490 are fixed to the bottom of the base 480. A lens center of the camera 420 in the center of the top plate 430 is just opposite to a bottom center of the slide glass 240, and the lens centers of the camera 420 and the camera 420 on both sides of the center are respectively opposite to the square bottom centers of the two total reflection right angle prisms 250. The side wall of the base 480 of the image acquisition and processing device 400 is fixed with a power interface 460 connected to a power supply or a computer, and a switch 470 for controlling equipment. Each camera 420 needs to have the following functions: a good backlight shooting effect; a HD Photo quality; and an adjustable focal length and no obvious distortion aberration within a required range. Each camera 420 may be a USB camera, a serial camera and other miniature cameras with the above functions. In this embodiment, USB wide dynamic 1080p backlight cameras with a focal length of 3.5 mm are adopted; the main control board 440 needs to be able to run customized programs.

In this implementation, Raspberry Pi 3rd generation B+ is adopted as the main control board 440, so as to efficiently run programs, process data and be easy to install; the interface extender 450 is used to extend the interface to ensure that the cameras 420, the main control board 440, the power interface 460 and the interface extender 450 are connected. In this embodiment, because the USB cameras are adopted, USB interface extenders and a USB power interface are adopted.

Figure 5:
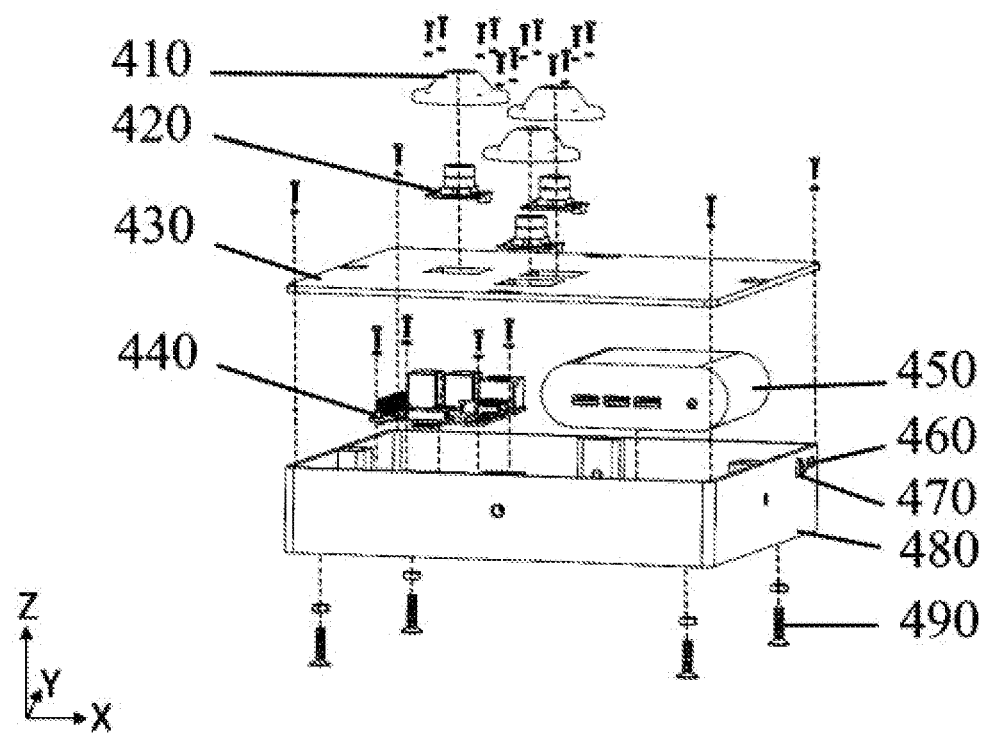
FIG. 5 is a schematic diagram of an image acquisition and processing device in the application.

With reference to FIG. 2 and FIG. 5, a multi-view fast photographing device for horny jaws of cephalopods further includes level assemblies; the level assemblies are composed of the level 220 fixed on the stage 270, the first adjusting nuts 260 connecting the stage 270 and the box 280, and the second adjusting nuts 490 fixed on the bottom of the base 480. The level 220 may be a bubble level, an electronic level and other instruments for detecting the level. In this embodiment, a bull's-eye bubble level is used to detect the level; this level is simple to install and low in cost, and meets precision requirements required by the device.

Figure 15:
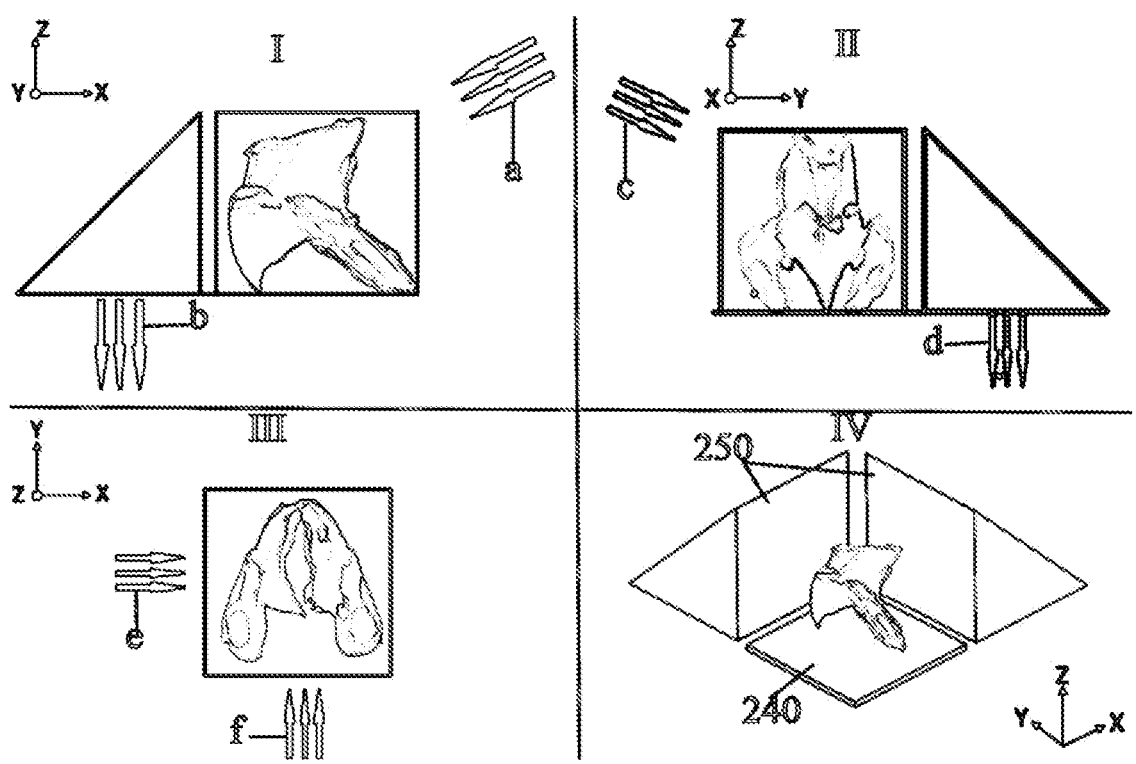
FIG. 15 is a schematic diagram of image generation according to the application.

With reference to FIG. 15, FIG. 15 is a front view of the sample being obtained, in which a is the light from one of the two A-type floodlights 210, and b is the image light reflected by the total reflection right angle prisms 250; one of the cameras 420 on both sides of the center of the top plate 430 takes photos to collect images, thus obtaining the front view of the sample; FIG. 2 is a side view of the sample being obtained, where c is the light from the A-type floodlights 210, and d is the image light reflected by the total reflection right angle prisms 250; the other of the cameras 420 on both sides of the center of the top plate 430 takes photos to collect the images, thus obtaining the side view of the sample; FIG. 3 is a bottom view of the sample being obtained, where e is the light from one of the B-type floodlights 230, and f is the light from the B-type floodlights 230; the camera 420 at the center of the top plate 430 takes photos to collect the images, thus obtaining the bottom view of the sample. FIG. 4 is the positions of the slide glass 240, the sample and the total reflection right angle prisms 250 on the stage 270; the device controls the three cameras 420 to take photos in turn, and the A-type floodlights 210 and the B-type floodlights 230 to illuminate in turn, so as to obtain three photos of the front view, the side view and the bottom view of the sample in turn.

An operation flow of the device is as follows:
Level adjustment: adjusting the bottom of the base 480 and an adjusting rod of the stage 270 to make a bubble of the bull's-eye bubble level locate in the center;
Device start: choosing two modes: offline or not according to an actual situation, connecting the external power supply or the computer, and then pressing the switch 470 to start the device;
Sample placement: flipping the cover 110, placing the horny jaw sample in the central area of the slide glass 240, and covering the cover 110 to ensure the device is sealed; and
Program operation flow: if an offline mode is selected, performing following steps: opening the software by operating the stylus 130; selecting an extraction mode: a batch mode or a single mode; displaying the data of current sample morphological parameters and saving the data in a form of text after processing through the software after an experimenter starts the software in the batch mode; obtaining batch data of horny jaw morphological parameters by repeating the step of displaying the data of current sample morphological parameters and saving the data in a form of text after processing through the software after an experimenter starts the software in the batch mode; displaying the data of the current sample morphological parameters after processing through the software without an automatic saving and saving the data manually after the experimenter starts the software in the single mode; and if the offline mode is selected, performing the step of selecting an extraction mode: a batch mode or a single mode and step of displaying the data of current sample morphological parameters and saving the data in a form of text after processing through the software after an experimenter starts the software in the batch mode of the offline mode using the computer.

The above shows and describes basic principles, main features and advantages of the application. It should be understood by those skilled in the art that the application is not limited by the above-mentioned embodiments. The above-mentioned embodiments and descriptions only illustrate the principles of the application. Without departing from the spirit and scope of the application, there are various changes and improvements of the application, all of which fall within the scope of the claimed application. The scope of the application is defined by the appended claim and their equivalents.

What is claimed is:
1. A multi-view fast photographing device for horny jaws of cephalopods, comprising a cover, a cover pin, a stylus, an image generating device, a data display device, and an image acquisition and processing device, wherein a top of the image generating device is open and provided with mounting holes, and the cover is connected with the mounting holes through the cover pin and movably covers the top of the image generating device; the image acquisition and processing device is fixed at a bottom of the image generating device; the data display device is fastened to a front side wall of the image generating device; a magnetic patch is fixed on a front surface of a baffle of the data display device; and the stylus is magnetically attracted to the magnetic patch.

2. The multi-view fast photographing device for the horny jaws of the cephalopods according to claim 1, wherein the image generating device comprises a box, two A-type floodlights, two B-type floodlights, a stage, a slide glass, a camera, two total reflection right angle prisms, a level, and first adjusting nuts;

two groups of threaded holes are respectively left at a same position of vertical center lines of two adjacent inner walls of the box; inner walls of the box are provided with the mounting holes; one A-type floodlight and one B-type floodlight are mounted on the adjacent inner walls of the box through a screw connection; a center of the stage and partial areas on both sides of the center are provided with concave slots, so as to horizontally mount the slide glass and the two total reflection right angle prisms respectively; mounting positions of the two total reflection right angle prisms are mirror symmetric about diagonal faces of the box; the level is fixed on the stage; the stage is connected to the mounting holes of the box through the first adjusting nuts.

3. The multi-view fast photographing device for the horny jaws of the cephalopods according to claim 2, wherein the two A-type floodlights are located above the two B-type floodlights; the two A-type floodlights form a certain included angle with a horizontal plane of the stage; the included angle meets following requirements: spots generated by each A-type floodlight are not directly hit a square side of each total reflection right angle prism; a center point of each A-type floodlight is aligned with the center point of the slide glass; and the cameras obtain clear photos; the two B-type floodlights respectively face square sides of the two total reflection right angle prisms, lower surfaces of the two B-type floodlights coincide with an upper surface of the stage, and horizontal center lines of the two B-type floodlights are orthogonal to a vertical center line of the stage.

4. The multi-view fast photographing device for the horny jaws of the cephalopods according to claim 2, wherein inner surfaces of the box and the cover are covered with black materials.

5. The multi-view fast photographing device for the horny jaws of the cephalopods according to claim 2, wherein rectangular sides of the total reflection right angle prisms are coated with optical films, the square sides and square bottoms are polished, and two triangular sides are frosted.

6. The multi-view fast photographing device for the horny jaws of the cephalopods according to claim 2, wherein the data display device comprises a baffle and a display screen; the front side wall of the box is provided with mounting grooves; the display screen is fastened in the mounting grooves of the box; the baffle has a rectangular notch, and the rectangular notch is assembled with the box through the screw connection and fixed on an outside of the display screen, ensuring that a display of the display screen is embedded in the rectangular notch of the baffle and completely exposed from the side of the box.

7. The multi-view fast photographing device for the horny jaws of the cephalopods according to claim 2, wherein the image acquisition and processing device comprises a base, a top plate, a main control board, an interface extender, three cameras, three camera protection shells and second adjusting nuts;

the bottom of the base is provided with the mounting holes and mounting slots, and the top is open; the center of the top plate and the partial areas of the both sides of the center are provided with the mounting grooves, and the mounting grooves on the both sides are mirror symmetrical with respect to the diagonal faces of the top plate; the top plate is connected with the base and fastened to the top of the base; the main control board is connected with the mounting holes and fastened to the bottom of the base; the interface extender is fixed in the mounting slots; circular notches are left at the tops of the three camera protection shells; the three cameras are respectively fastened above the three mounting grooves; the three camera protection shells are respectively fastened above the three cameras, and ensure that lenses of the cameras are embedded in the circular notches and completely exposed upwards; the second adjusting nuts are fixed at the bottom of the base.

8. The multi-view fast photographing device for the horny jaws of the cephalopods according to claim 7, wherein a lens center of the camera in the center of the top plate is just opposite to a bottom center of the slide glass, and the lens centers of the two cameras on the both sides of the center of the top plate are respectively opposite to the square bottom centers of the two total reflection right angle prisms.

9. The multi-view fast photographing device for the horny jaws of the cephalopods according to claim 1, wherein the side wall of the base of the image acquisition and processing device is fixed with a power interface connected with a power supply or a computer, and a button for controlling a switch of the device.

10. The multi-view fast photographing device for the horny jaws of the cephalopods according to claim 7, further comprising level assemblies, wherein the level assemblies are composed of a level fixed on the stage, the first adjusting nuts connecting the stage and the box, and the second adjusting nuts fixed on the bottom of the base.

* * * * *